United States Patent [19]

Rice

[11] Patent Number: 4,904,205
[45] Date of Patent: Feb. 27, 1990

[54] RETRACTABLE BOOSTER CABLES

[76] Inventor: Mark D. Rice, Rte. 1, Box 27A, Montrose, Ark. 71658

[21] Appl. No.: 202,009

[22] Filed: Jun. 2, 1988

[51] Int. Cl.$^4$ ........................................... H01R 11/00
[52] U.S. Cl. .................................. 439/504; 191/12.4; 242/96; 439/34
[58] Field of Search .......................... 439/34, 501–504, 439/506; 191/12.4; 242/96, 107.11, 107.13

[56] References Cited

U.S. PATENT DOCUMENTS

| | | | |
|---|---|---|---|
| 1,701,646 | 2/1929 | Taylor | 339/10 |
| 3,337,695 | 8/1967 | Brown | 191/12.4 |
| 3,483,898 | 12/1969 | Tini | 191/12.2 |
| 3,813,632 | 5/1974 | Drewry | 439/34 |
| 3,821,496 | 5/1974 | De Malone | 191/12.2 |
| 4,006,952 | 2/1977 | Puckett | 191/12.4 |
| 4,079,304 | 3/1978 | Brandenburg | 439/34 |
| 4,146,282 | 3/1979 | Gay | 439/34 |
| 4,174,873 | 11/1979 | Hargett | 339/10 |
| 4,282,954 | 8/1981 | Hill | 191/12.4 |
| 4,343,522 | 8/1982 | O'Neil | 339/28 |
| 4,466,581 | 8/1984 | Hill | 242/96 |
| 4,653,833 | 3/1987 | Czubernat et al. | 439/504 |

FOREIGN PATENT DOCUMENTS 17605  9/1903  Sweden .

Primary Examiner—P. Austin Bradley
Attorney, Agent, or Firm—Fleit, Jacobson, Cohn, Price, Holman & Stern

[57] ABSTRACT

Retractable battery booster cables adapted to be mounted on an automobile and including a structure for connection to the battery of the automobile in which the booster cables are mounted and a spring wound reel to maintain the battery booster cables in compact, stored condition with the cables being easily extended for use in boosting either the battery in the automobile in which the booster cables are mounted or a battery in an adjacent automobile. The retractable battery booster cables include a housing for the spring wound reel and a unique structure for electrically connecting the cables connected to the battery to the extendable and retractable booster cable. Additionally, the booster cables are provided with an alternate arrangement for connection to an adjacent vehicle with the alternate arrangement including a battery clamp arrangement or a plug-in type of connector.

6 Claims, 2 Drawing Sheets

RETRACTABLE BOOSTER CABLES

BACKGROUND OF THE INVENTION

FIELD OF THE INVENTION

The present invention generally relates to retractable battery booster cables and more particularly to cables adapted to be mounted on an automobile and including a structure for connection to the battery of the automobile in which the booster cables are mounted and a spring wound reel to maintain the battery booster cables in compact, stored condition with the cables being easily extended for use in boosting either the battery in the automobile in which the booster cables are mounted or a battery in an adjacent automobile. The retractable battery booster cables include a housing for the spring wound reel and a unique structure for electrically connecting the cables connected to the battery to the extendable and retractable booster cables. Additionally, the booster cables are provided with an alternate arrangement for connection to an adjacent vehicle with the alternate arrangement including a battery clamp arrangement or a plug-in type of connector.

INFORMATION DISCLOSURE STATEMENT

Battery booster cables to connect the battery of one vehicle to the battery of another to assist one of the vehicles when starting the engine are well-known and have been utilized for a number of years. Storage of battery booster cables has been a problem and continues to be a problem since the trunk area or other storage area of automobiles is frequently cluttered with various items including battery booster cables loosely placed therein. Some efforts have been made to provide a wind-up or retractable reel-type storage device for battery booster cables. However, such devices have a problem area of connecting the stationary cable component with the retractable and extendable cable component. None of the prior art discloses the particular structural arrangement incorporated into this invention.

SUMMARY OF THE INVENTION

An object of the present invention is to provide a retractable battery booster cable assembly including a housing which can be mounted under the hood of an automobile or similar vehicle and a pair of cables with each cable including a stationary component connected to the storage battery of the vehicle in which the housing is mounted and an extendable and retractable component mounted on a spring wound reel with a unique structure being provided to electrically connect the stationary cable components with the retractable and extendable cable components.

Another object of the invention is to provide a booster cable assembly as set forth in the preceding object in which the electrical connection includes concentric conducting rings mounted on the housing and on a cable reel with spring means biasing the conducting rings into sliding electrical contact and insulation material completely isolating the conducting rings from each other while maintaining their concentric relation.

A further object of the invention is to provide a battery booster cable assembly in accordance with the preceding objects in which the extendable and retractable cable components have a plug-in connector at the free end thereof by which a clamp structure can be connected to the extendable and retractable component of the cable or the plug-in connector may be connected to similar plug-in connectors on an identical booster cable assembly in an adjacent vehicle to eliminate any possible arcing and possible injury due to exploding gasses that sometimes occur when a booster cable is connected to a battery terminal.

Still another object of the invention is to provide a battery booster cable assembly which includes a ratchet mechanism to retain the movable cable components in an extended position so that the cable will not be under constant tension during use.

Yet another object of the invention is to provide an extendable and retractable battery booster cable assembly which is effective in operation, easy to install, easy and safe to use, long lasting and efficient in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
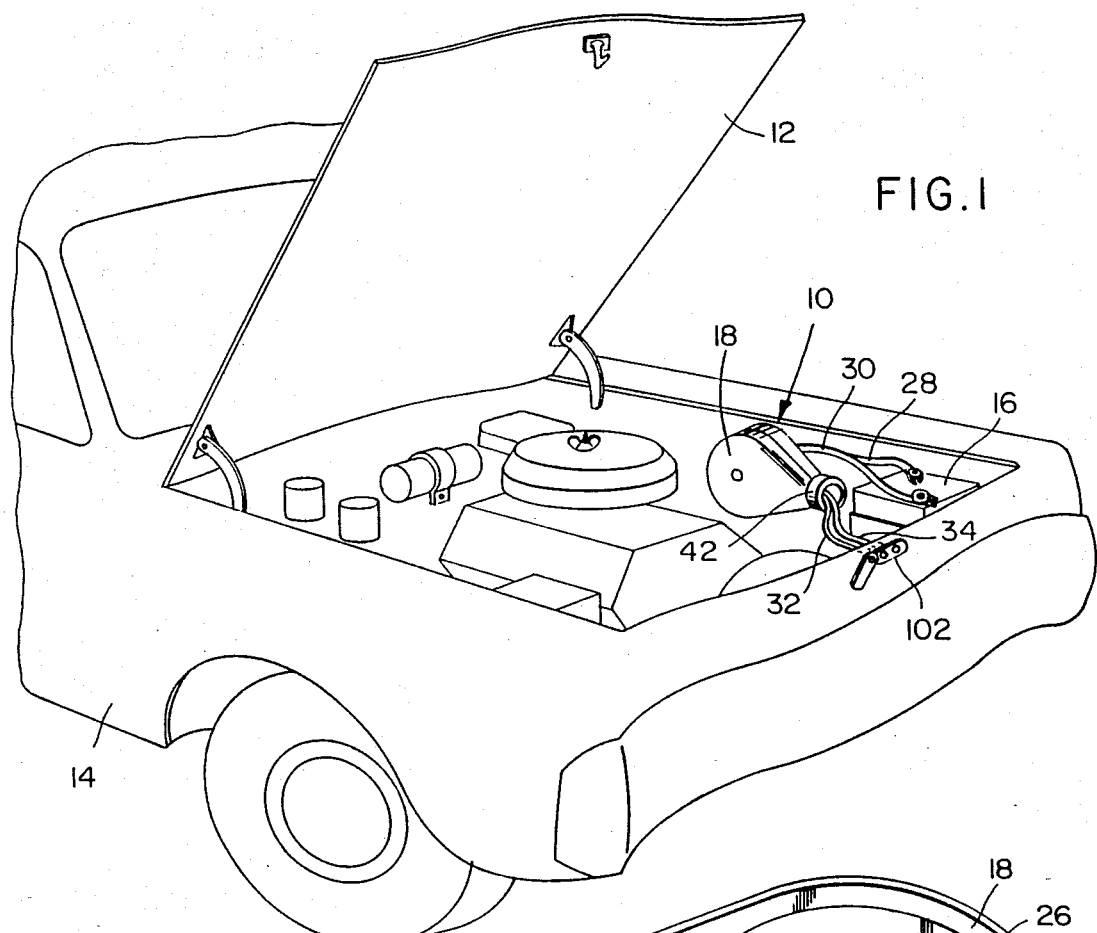
FIG. 1 is a perspective view illustrating the battery booster cable assembly of the present invention installed in a typical position under the hood of an automobile with the assembly connected to the terminals of the battery in the automobile.
Figure 5:
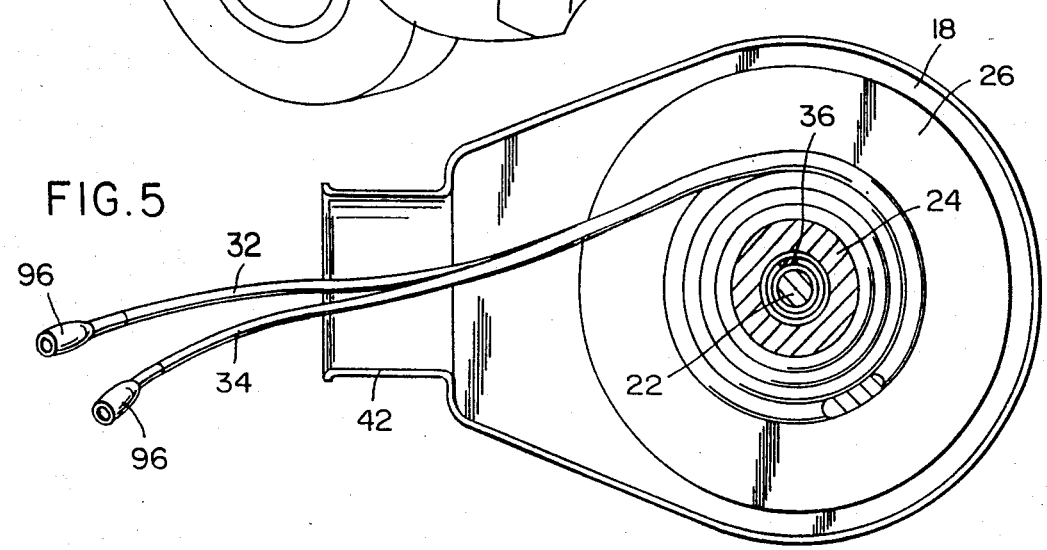
FIG. 5 is a sectional view of the housing and reel illustrating the movable cable components wound thereon.
Figure 7:
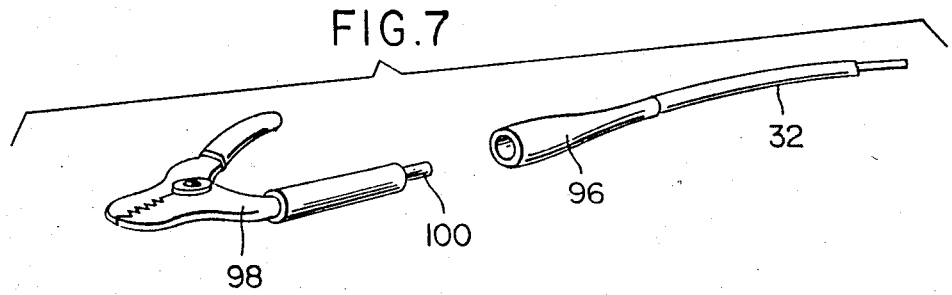
FIG. 7 is a fragmental, perspective view of the plug-in type connector on the ends of the movable cable components.

Referring now specifically to the drawings, the numeral 10 generally designates the battery booster cable assembly of the present invention which is illustrated in position under the hood 12 of an automobile 14 having a storage battery 16 of conventional construction. The structure of the automobile is completely conventional and the battery booster cable assembly of the present invention is installed therein without any modification to the automobile except that the battery booster cable assembly 10 is electrically connected to the storage battery 16 in a manner schematically illustrated in FIGS. 1 and 2. The battery booster cable assembly 10 includes a housing 18 of plastic material or the like and the housing includes a spring wound reel 20 journalled therein on a shaft 22. The reel 20 includes a hub 24 and spaced circular plates or discs 26. Booster cables are mounted on the spring wound reel with stationary booster cable components 28 and 30 being connected to the battery 16 and movable cable components 32 and 34 which are extendable and retractable are mounted on the reel 20 so that as tension is applied to the cable components 32 and 34, they will be unwound by rotating the reel 20 which is spring wound by a coil spring 36 which is mounted on the shaft 20 with one end anchored to the shaft or housing at 38 and the other end connected to the reel as at 40 so that the reel 20 will be spring biased in a direction to wind the extendable and retractable cable components 32 and 34 onto the reel but yet permit the cables to unwind when the cable components 32 and 34 are pulled out through an entrance opening 42 on the housing 18.

Figure 2:
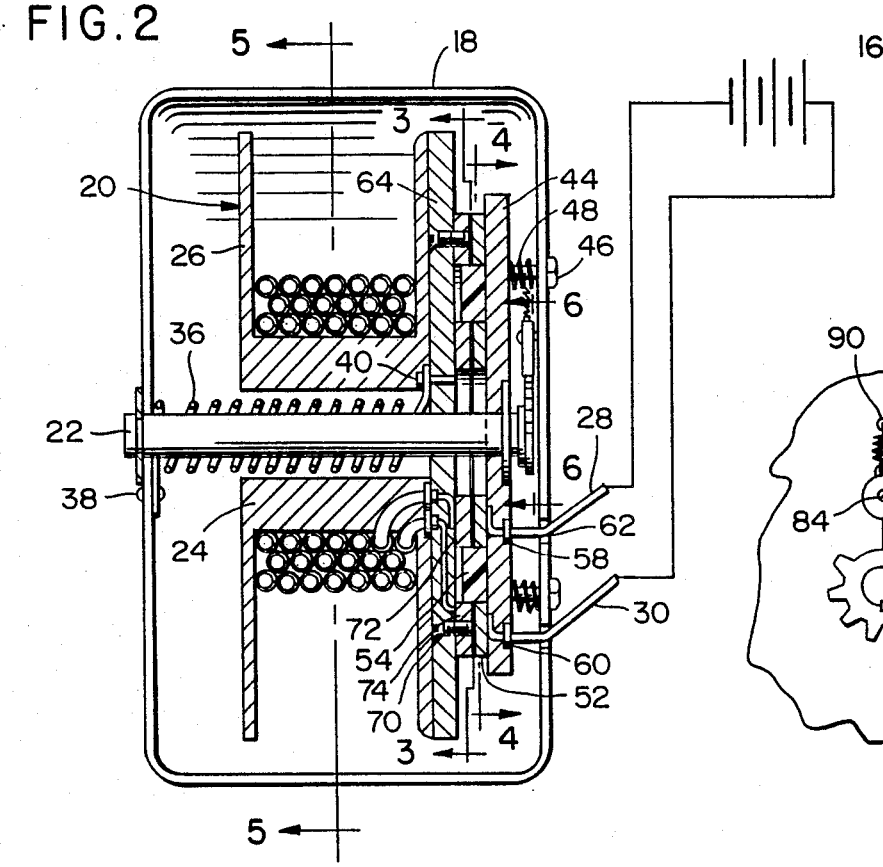
FIG. 2 is a vertical, sectional view, on an enlarged scale, of the housing, spring wound reel and electrical system incorporated into the present invention.
Figure 6:
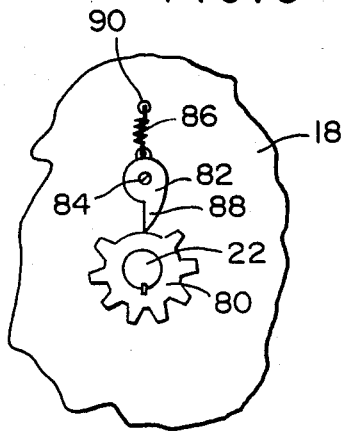
FIG. 6 is a fragmental view of the ratchet mechanism associated with the housing and rotatable reel.
Figure 3:
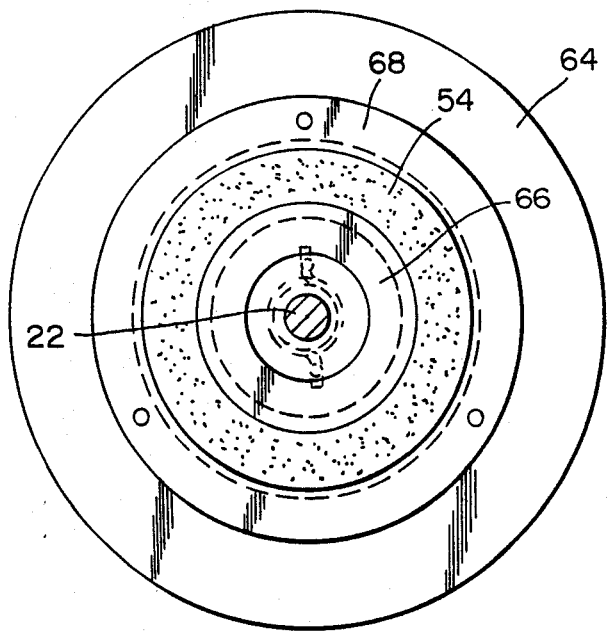
FIG. 3 is a transverse, sectional view taken substantially upon a plane passing along section line 3—3 on FIG. 2 illustrating the structure of the concentric rings on the rotatable reel.
Figure 4:
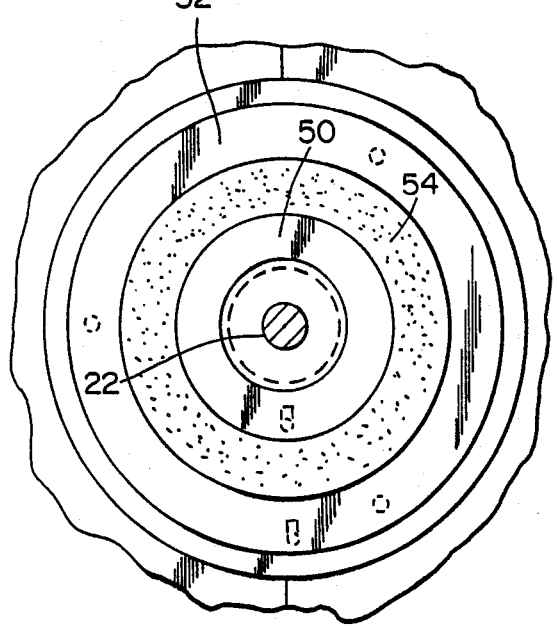
FIG. 4 is a sectional view taken substantially upon a plane passing along section line 4—4 on FIG. 2 illustrating the concentric rings on the stationary housing.

One side of the housing 18 includes a mounting plate 44 of circular configuration which is supported from the housing 18 by a plurality of fastening bolts 46 which extend in through the housing 18 and have the inner end connected to the plate 44 which is spaced from the housing 18. Coil springs 48 are disposed around the fastening bolts 46 between the plate 44 and the interior of the housing 18 so that the plate is resiliently biased away from the housing 18. Mounted on the surface of the plate 44 remote from the housing 18 is a pair of concentric annular conductive rings 50 and 52 which are concentrically spaced from each other and isolated from each other by a ring 54 of insulating material. The conductive rings 50 and 52, respectively, are electrically connected to the stationary cable components 28 and 30 as illustrated in FIG. 2 with the connecting points being designated by numerals 58 and 60. The cable components 28 and 30 extend through apertures 62 in the housing 18 with the cables being provided with some slack or capable of slight inward and outward movement so that the mounting plate 44 can move within certain limits inwardly and outwardly in relation to the housing 18. The reel 20 includes a mounting plate 64 on one surface thereof to which is attached a pair of annular conductive rings 66 and 68 which are concentrically spaced from each other and secured to the plate 64 by fastening devices 70. As illustrated in FIG. 2, the insulating ring 54 which isolates the conductive rings 50 and 52 is thicker than the conductive rings 52 and 50 so that its outer edge extends between the conductive rings 66 and 68 thereby assuring complete isolation of the conductive rings. When the device is properly assembled, the conductive rings 50 and 66 are in contact with each other and the conductive rings 52 and 68 are in contact with each other with the contact being surface-to-surface engagement. The rings 66 and 68 are connected to the conductors 32 and 34 at contact points 72 and 74. This arrangement provides for continuity of the electrical circuit from the battery 16 through the cable components 28 and 30, the annular rings 50 and 52, the annular rings 66 and 68 and the cable components 32 and 34 with the surface-to-surface engagement of the conductive rings enabling rotational movement of the reel 20 in relation to the housing and plate 44 which is rotationally stationary but is spring biased to urge it inwardly to bias the rings 50 and 52 into electrical contact with the rings 66 and 68.

A ratchet structure is provided between the rotatable reel 20 and the housing and shaft. The ratchet mechanism includes a segmental gear that is indicated by reference numeral 80 which is in engagement with a pivotal pawl or dog 82 that is mounted on a pin or shaft 84 and includes a coil spring 86 engaged with an end portion thereof opposite to the tapered tip end 88 which is in contact with the gear teeth on the segmental gear 80. The spring 86 is anchored at 90 to enable the pawl or dog 82 to pivot so that the portion of the segmental gear 80 that is void of teeth as indicated by numeral 92 can register with the pawl or dog 82 or the gear teeth 94 on the segmental gear 80 can register and be engaged by the pawl or dog 82. This enables any desired quantity or length of cable to be unwound from the reel and the reel stopped at any point. Then, when the cable is desired to be rewound, the cable is pulled outwardly to release the ratchet so that the cable reel will rewind the cable onto the reel.

The cable components 32 and 34 each are provided with a female end socket 96 which can have a clamp structure 98 detachably connected thereto with the clamp structure including a projecting plug 100 that is electrically connected to and slidably received in the female socket 96. Preferably, the sockets 96 are received in a housing 102 mounted on the grill or any suitable area of the front of the vehicle body so the plugs are always accessible to the exterior but are received in sockets in the housing 102 which have suitable doors or covers covering the sockets 96 to protect them from water and dirt. With this arrangement, vehicles similarly equipped can be connected by cable segments having male plugs on each end thereof. If the vehicle with this device installed is to be connected to a vehicle battery which does not have this assembly installed, then a clamp structure 98 is attached to each socket 96 and the cables 32 and 34 pulled outwardly and used in the normal manner of using booster cables or jumper cables.

With the structure of the present invention installed in a vehicle, battery booster cables are always available and are stored in a compact and convenient manner without occupying a substantial trunk area. Also, the manner of mounting the housing and the specific configuration of the housing may vary depending upon the underhood space limitations that may be encountered in certain types of vehicles. Also, the housing may be constructed of metal, plastic or any other suitable material and other components also may be constructed of plastic as long as the cables, the connectors and the contacting conductive rings are all constructed of conductive material in order to conduct electrical energy from one storage battery to another when the booster cables are properly connected.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

WHAT IS CLAIMED AS NEW IS AS FOLLOWS:

1. Retractable booster cables for connecting storage batteries of vehicles for boosting the electrical capacity of one of the batteries from the other of the batteries comprising a housing adapted to be mounted under the hood on a vehicle, a reel positioned in the housing, means rotatably supporting the reel in the housing, spring means interconnecting the reel and housing to spring bias the reel rotatably in one direction, a pair of booster cables wound on the reel with the reel being spring biased to wind the cables on the reel but enabling the cables to be pulled outwardly of the housing by rotating the reel against the spring means, means on the free end of each cable to electrically connect the cables to a battery associated with a vehicle different from the one in which the housing is mounted, means electrically connecting the other end of each cable to the battery in the vehicle in which the housing is mounted, said means connecting the ends of the cables to the battery in which the housing is mounted including means transmitting electrical energy from the terminal posts of the battery to the individual cables while maintaining electrical contact and circuit insulation during rotation of the reel, said means transmitting electrical energy from the battery in the vehicle in which the housing is mounted to the cables including concentric conductive rings mounted on the housing in a non-rotative manner, a pair of concentric conductive rings mounted on the reel in electrical contact with the rings on the housing, said rings on the housing being concentrically and radially spaced and the rings on the reel being concentrically and radially spaced, means mounting the rings on the housing biasing the rings on the housing toward and into engagement with the rings on the reel to maintain good electrical contact, and an insulation ring mounted on the housing between the concentric rings mounted thereon with the insulation ring being thicker than the conductive rings and extending laterally beyond the conductive rings on the housing and extending into the space between the rings on the reel to maintain the rings in alignment and electrically insulate the concentric rings from each other.

2. The structure as defined in claim 1 wherein said means mounting the concentric rings on the housing includes a plurality of mounting bolts extending through the housing and connected to the rings with the rings being spaced from the housing and coil springs mounted on the bolts biasing the rings on the housing toward the rings on the reel.

3. Retractable booster cables for connecting storage batteries of vehicles for boosting the electrical capacity of one of the batteries from the other of the batteries comprising a housing adapted to be mounted under the hood on a vehicle, a reel positioned in the housing, means rotatably supporting the reel in the housing, spring means interconnecting the reel and housing to spring bias the reel rotatably in one direction, a pair of booster cables wound on the reel with the reel being spring biased to wind the cables on the reel but enabling the cables to be pulled outwardly of the housing by rotating the reel against the spring means, means on the free end of each cable to electrically connect the cables to a battery associated with a vehicle different from the one in which the housing is mounted, means electrically connecting the other end of each cable to the battery in the vehicle in which the housing is mounted, said means connecting the ends of the cables to the battery in which the housing is mounted including means transmitting electrical energy from the terminal posts of the battery to the individual cables while maintaining electrical contact and circuit insulation during rotation of the reel, said means transmitting electrical energy from the battery in the vehicle in which the housing is mounted to the cables including concentric conductive rings mounted on the housing in a non-rotative manner, a pair of concentric conductive rings mounted on the reel in electrical contact with the rings on the housing, said rings on the housing being concentrically and radially spaced and the rings on the reel being concentrically and radially spaced, means mounting the rings on the housing biasing the rings on the housing toward and into engagement with the rings on the reel to maintain good electrical contact, and an insulation ring mounted on the housing between the concentric rings mounted thereon with the insulation ring being thicker than the conductive rings and extending laterally beyond the conductive rings on the housing and extending into the space between the rings on the reel to maintain the rings in alignment and electrically insulate the concentric rings from each other, said means on the ends of the cable for connection with the vehicle different from the one in which the housing is mounted includes a socket on the free end of each cable, means on the vehicle receiving the sockets and retaining them in exposed relation to the exterior of the vehicle to provide access thereto without elevating the hood of the vehicle in which the housing is mounted with the sockets being movable to a position spaced from the vehicle having the housing mounted therein for connection with a battery in a different vehicle, said means mounting the concentric rings on the housing including a plurality of mounting bolts extending through the housing and connected to the rings with the rings being spaced from the housing and coil springs mounted on the bolts biasing the rings on the housing toward the rings on the reel.

4. The structure as defined in claim 3 wherein said sockets are adapted to frictionally engage a connecting cable segment for connection with sockets on a similarly mounted booster cable assembly in the different vehicle.

5. The structure as defined in claim 3 together with battery clamp means inserted into the sockets for connecting the cables to the battery terminals in a different vehicle.

6. The structure as defined in claim 3 together with ratchet means retaining the cables in extended position when pulled outwardly and being releasable to spring bias the cables into rewound position on the reel.

* * * * *